US010969942B2

(12) United States Patent
Wang et al.

(10) Patent No.: US 10,969,942 B2
(45) Date of Patent: Apr. 6, 2021

(54) METHOD AND DEVICE FOR DISPLAYING INTERFACE

(71) Applicant: BEIJING XIAOMI MOBILE SOFTWARE CO., LTD., Beijing (CN)

(72) Inventors: Ting Wang, Beijing (CN); Hai Long, Beijing (CN); Zile Zou, Beijing (CN); Wei Yu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 72 days.

(21) Appl. No.: 16/255,782

(22) Filed: Jan. 23, 2019

(65) Prior Publication Data

US 2019/0235716 A1 Aug. 1, 2019

(30) Foreign Application Priority Data

Jan. 31, 2018 (CN) .......................... 201810099017.5

(51) Int. Cl.
*G06F 3/0484* (2013.01)
*G06F 3/0488* (2013.01)
*H04M 1/725* (2021.01)

(52) U.S. Cl.
CPC .......... *G06F 3/0484* (2013.01); *G06F 3/0488* (2013.01); *G06F 3/04883* (2013.01);
(Continued)

(58) Field of Classification Search
CPC .. G06F 3/0484; G06F 3/0488; G06F 3/04883; G06F 3/04886; H04M 1/72519; H04M 1/72544; H04M 2250/22
See application file for complete search history.

(56) References Cited

U.S. PATENT DOCUMENTS 6,654,947 B1 * 11/2003 North ...................... G06F 9/451
717/101
2006/0242607 A1 * 10/2006 Hudson ............... G06F 3/04817
715/863
(Continued)

FOREIGN PATENT DOCUMENTS

CN 104750351 A 7/2015
CN 105446614 A 3/2016
(Continued)

OTHER PUBLICATIONS

Extended European Search Report in the European Application No. 19154508.6, dated Jun. 6, 2019, (29p).
(Continued)

*Primary Examiner* — Ryan Barrett
(74) *Attorney, Agent, or Firm* — Arch & Lake LLP

(57) ABSTRACT

A method and device for displaying an interface are provided. The method includes creating a fully-transparent sensing hot region displayed in a top layer in a screen; receiving a touch operation event, a starting touch position of the touch operation event being located in the sensing hot region; acquiring a lateral displacement of a sliding operation event when the touch operation event is the sliding operation event, the lateral displacement being a displacement in a width direction of the screen; detecting whether the lateral displacement is greater than a first threshold; and in response to determining that the lateral displacement is greater than the first threshold, switching from a first User Interface (UI) presently displayed in the screen into a second UI for display when the sliding operation event completes, wherein the second UI is a previous UI displayed immediately prior to the first UI.

20 Claims, 10 Drawing Sheets

(52) U.S. Cl.
CPC .... *G06F 3/04886* (2013.01); *H04M 1/72519* (2013.01); *H04M 1/72544* (2013.01); *H04M 2250/22* (2013.01)

(56) References Cited

U.S. PATENT DOCUMENTS

| | | | |
|---|---|---|---|
| 2009/0174679 A1* | 7/2009 | Westerman | G06F 3/0418 345/173 |
| 2009/0293007 A1* | 11/2009 | Duarte | G06F 3/0482 715/767 |
| 2010/0153871 A1* | 6/2010 | Yokoyama | G09B 29/106 715/768 |
| 2011/0078624 A1* | 3/2011 | Missig | G06F 3/04886 715/802 |
| 2013/0084920 A1* | 4/2013 | Sawhney | G06F 3/0481 455/566 |
| 2013/0145290 A1 | 6/2013 | Weber et al. | |
| 2013/0154959 A1 | 6/2013 | Lindsay et al. | |
| 2013/0222257 A1* | 8/2013 | Kwon | G06F 3/04883 345/169 |
| 2014/0282272 A1* | 9/2014 | Kies | G06F 3/013 715/863 |
| 2014/0298249 A1* | 10/2014 | Lee | G06F 9/451 715/781 |
| 2015/0128086 A1* | 5/2015 | Amerige | G06F 3/04883 715/781 |
| 2015/0324078 A1* | 11/2015 | Dipin | G06F 3/0485 715/765 |
| 2016/0004432 A1* | 1/2016 | Bernstein | G06F 3/0486 715/769 |
| 2017/0003859 A1 | 1/2017 | Yang | |
| 2018/0004402 A1 | 1/2018 | Liang | |
| 2018/0210645 A1* | 7/2018 | Schaefer | G06F 3/04842 |
| 2018/0335921 A1* | 11/2018 | Karunamuni | G06F 3/0488 |

FOREIGN PATENT DOCUMENTS

| | | | | |
|---|---|---|---|---|
| EP | 3232311 A1 | | 10/2017 | |
| EP | 3521991 A1 | * | 8/2019 | ........... G06F 3/0484 |

OTHER PUBLICATIONS

First Office Action issued to the Chinese Application No. 201810099017.5, dated Aug. 27, 2020 with English translation, (22p).

* cited by examiner

METHOD AND DEVICE FOR DISPLAYING INTERFACE

CROSS-REFERENCE TO RELATED APPLICATION

This application is based on and claims priority of Chinese Patent Application No. 201810099017.5, filed on Jan. 31, 2018, which is incorporated herein by reference in its entirety for all purposes.

TECHNICAL FIELD

The present disclosure relates to the field of terminals, and particularly, to a method and device for displaying an interface.

BACKGROUND

In use of a mobile phone by a user, a requirement for interface switching that is often used is to switch a presently displayed User Interface (UI) of the mobile phone to a previous UI.

For a conventional mobile phone, a touch button for realizing an interface return function is usually arranged at a position below a screen and a user may click on the touch button to trigger the mobile phone to be switched from a presently displayed first UI to a second UI which is a previous UI displayed immediately prior to the first UI.

With increase of screen-to-body ratios of mobile phones, touch buttons below the screens will be eliminated. New ways to realize the interface switching are desired.

SUMMARY

According to a first aspect of the present disclosure, there is provided a method for displaying an interface, the method comprising creating a fully-transparent sensing hot region displayed in a top layer in a screen, wherein the sensing hot region comprises of a first hot region and/or a second hot region, and the screen is divided along a perpendicular bisector in a length direction of the screen into a first screen region and a second screen region, the first hot region being located in the first screen region and having an area less than or equal to an area of the first screen region, the second hot region being located in the second screen region and having an area less than or equal to an area of the second screen region; receiving a touch operation event, a starting touch position of the touch operation event being located in the sensing hot region; acquiring a lateral displacement of a sliding operation event when the touch operation event is the sliding operation event, the lateral displacement being a displacement in a width direction of the screen; detecting whether the lateral displacement is greater than a first threshold; and in response to determining that the lateral displacement is greater than the first threshold, switching from a first User Interface (UI) presently displayed in the screen into a second UI for display when the sliding operation event completes, wherein the second UI is a previous UI displayed immediately prior to the first UI.

According to a second aspect of the present disclosure, there is provided a device for displaying an interface, the device comprising: a processor; and a memory configured to store an instruction executable for the processor, wherein the processor is configured to: create a fully-transparent sensing hot region displayed in a top layer in a screen, wherein the sensing hot region comprises of a first hot region and/or a second hot region, and the screen is divided along a perpendicular bisector in a length direction of the screen into a first screen region and a second screen region, the first hot region being located in the first screen region and having an area less than or equal to an area of the first screen region, the second hot region being located in the second screen region and having an area less than or equal to an area of the second screen region; receive a touch operation event, a starting touch position of the touch operation event being located in the sensing hot region; acquire a lateral displacement of a sliding operation event when the touch operation event is the sliding operation event, the lateral displacement being a displacement in a width direction of the screen; detect whether the lateral displacement is greater than a first threshold; and in response to determining that the lateral displacement is greater than the first threshold, switch from a first User Interface (UI) presently displayed in the screen into a second UI for display when the sliding operation event completes, wherein the second UI is a previous UI displayed immediately prior to the first UI.

According to a third aspect of the present disclosure, there is provided a non-transitory computer-readable storage medium, having a computer program stored thereon, that when being executed by a processor, performs the operations of: creating a fully-transparent sensing hot region displayed in a top layer in a screen, wherein the sensing hot region comprises of a first hot region and/or a second hot region, and the screen is divided along a perpendicular bisector in a length direction of the screen into a first screen region and a second screen region, the first hot region being located in the first screen region and having an area less than or equal to an area of the first screen region, the second hot region being located in the second screen region and having an area less than or equal to an area of the second screen region; receiving a touch operation event, a starting touch position of the touch operation event being located in the sensing hot region; acquiring a lateral displacement of a sliding operation event when the touch operation event is the sliding operation event, the lateral displacement being a displacement in a width direction of the screen; detecting whether the lateral displacement is greater than a first threshold; and in response to determining that the lateral displacement is greater than the first threshold, switching from a first User Interface (UI) presently displayed in the screen into a second UI for display when the sliding operation event completes, wherein the second UI is a previous UI displayed immediately prior to the first UI.

It is to be understood that the foregoing general description and the following detailed description are only exemplary and explanatory and not intended to limit the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

DETAILED DESCRIPTION

Figure 1:
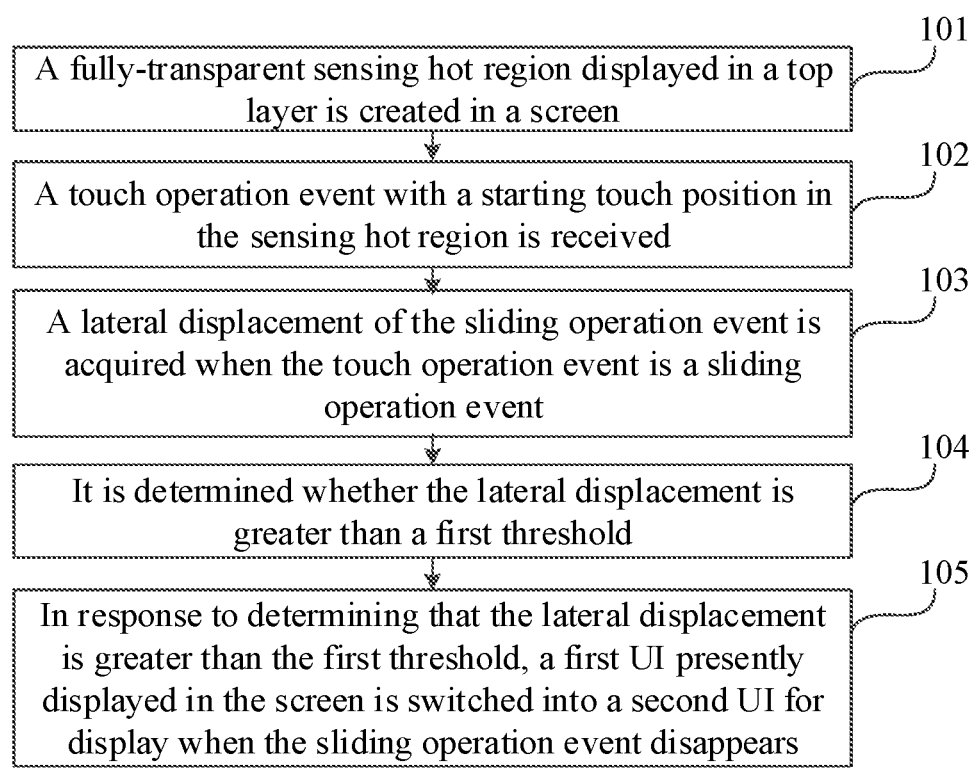
FIG. 1 is a flow chart showing a method for displaying an interface according to an exemplary aspect.

Reference is made in detail to exemplary aspects, examples of which are illustrated in the accompanying drawings. The following description refers to the accompanying drawings in which the same numeral in different drawings represent the same or similar elements unless otherwise indicated. The implementations set forth in the following description of exemplary aspects do not represent all implementations consistent with the present disclosure. Instead, they are merely examples of apparatuses and methods consistent with aspects related to the present disclosure.

The terminology used in the present disclosure is for the purpose of describing particular examples only and is not intended to limit the present disclosure. As used in this disclosure and the appended claims, the singular forms "a", "an", and "the" are intended to include the plural forms as well, unless the context clearly indicates otherwise. It should also be understood that the term "and/or" as used herein refers to and includes any and all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

In some examples, the term "length direction" and "width direction" of a display screen may be used for reference to longitudinal and lateral directions of the screen respectively. The screen may have a greater dimension in its length direction than in its width direction. Alternatively, these terms may be used with respect to a user where length direction may refer to an up-and-down direction with respect to the user, and width direction may refer to a left-and-right direction with respect to the user. In this case, the dimension in the length direction of the screen may be less than or equal to the width direction. The terms "long side" and "short side" may be construed similarly.

An execution entity for each operation of a method provided in the aspects of the present disclosure may be a mobile terminal such as a mobile phone, a tablet computer, a multimedia playing device, an electronic book reader or a personal digital assistant. The mobile terminal is provided with a screen. The screen may be a touch display screen and has a function of displaying a UI and receiving a touch operation event. The screen is usually arranged on a front panel of the mobile terminal. In an optional example, the screen has a high screen-to-body ratio which for example is higher than 80%, 90% or 95%. The screen with such a high screen-to-body ratio may be called Full Screen Display.

One calculation manner for the screen-to-body ratio is: (area of the touch display screen/area of the front panel of the mobile terminal)*100%. Another calculation manner for the screen-to-body ratio is: (area of an actual display region in the touch display screen/area of the front panel of the mobile terminal)*100%. Yet another calculation manner for the screen-to-body ratio is: (diagonal of the touch display screen/diagonal of the front panel of the mobile terminal) *100%. In the aspects of the present disclosure, it is not intended to limit the calculation manners for the screen-to-body ratio.

For ease of explanation, introductions and descriptions will be made in the following method aspect with the execution entity for each operation being the mobile terminal, and are not intended to be limited thereto.

In some examples, an interface return function may be realized by a user triggering a sliding operation event of sliding upwards from a bottom of a screen. When a sliding speed and sliding distance both meet preset conditions, a mobile phone is triggered to execute an interface return operation.

FIG. 1 is a flow chart showing a method for displaying an interface according to an exemplary aspect. The method may include the following operations.

In 101, a fully-transparent sensing hot region displayed in a top layer is created in a screen.

The sensing hot region is a region configured to receive a sliding operation event for triggering an interface return function. Displaying of the sensing hot region in a top layer in the screen refers that a display level of the sensing hot region is set to be highest and the display level of the sensing hot region is higher than a display level of any other contents in the screen. A content with a higher display level is arranged on an upper layer with respect to a content with a lower display level. When an overlapped region exists between the content with the higher display level and the content with the lower display level in a direction perpendicular to the screen, a content, in the overlapped region, of the content with the lower display level will be covered and masked by the content with the higher display level. In addition, since the sensing hot region is displayed in a fully-transparent manner, the sensing hot region is invisible for a user and a non-transparent content displayed in a lower layer with respect to the sensing hot region is visible for the user. The contents displayed in the examples are usually non-transparent unless otherwise specified.

Figure 2:
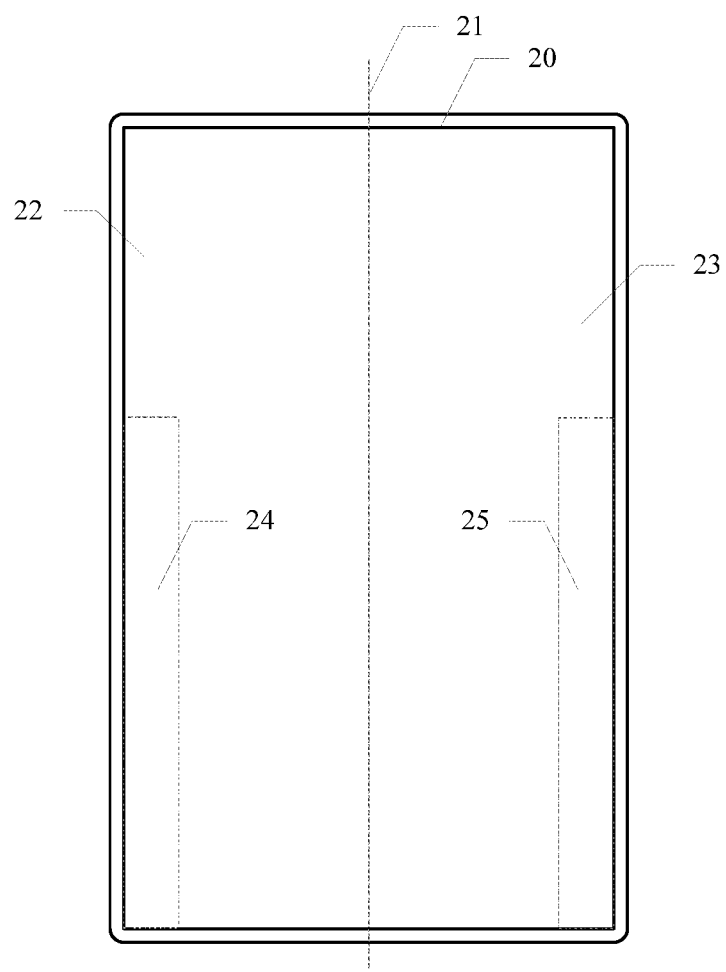
FIG. 2 is an exemplary schematic diagram illustrating a sensing hot region.

The sensing hot region includes a first hot region and/or a second hot region. As shown in FIG. 2, the screen 20 is divided along a perpendicular bisector 21 in a length direction of the screen 20 into a first screen region 22 (on left side) and a second screen region 23 (on right side). The first hot region 24 is located in the first screen region 22 and an area of the first hot region 24 is less than or equal to an area of the first screen region 22. The second hot region 25 is located in the second screen region 23 and an area of the second hot region 25 is less than or equal to an area of the second screen region 23.

In a case that the sensing hot region includes the first hot region 24, the sliding operation event configured to trigger the interface return function includes: a sliding operation event with a starting position in the first hot region 24 and with a sliding direction to the right. In a case that the sensing hot region includes the second hot region 25, the sliding operation event configured to trigger the interface return function includes: a sliding operation event with a starting position in the second hot region 25 and with a sliding direction to the left.

In an optional example, as shown in FIG. 2, the first hot region 24 is a first rectangular region sequentially enclosed by a first long side, a first short side, a second long side and a second short side. The first long side is overlapped with a left long side of the screen 20 and has a length less than or equal to a length of the left long side of the screen 20. The second hot region 25 is a second rectangular region sequentially enclosed by a third long side, a third short side, a fourth long side and a fourth short side. The third long side is overlapped with a right long side of the screen 20 and has a length less than or equal to a length of the right long side of the screen 20.

When the length of the first long side is less than the length of the left long side of the screen 20 and the length of the third long side is less than the length of the right long side of the screen 20, there is a part of display region un-masked by the sensing hot region in the screen 20. When a user triggers a touch operation event in this part of the display region, a UI displayed in the screen 20 and located in the lower layer with respect to the sensing hot region may directly respond to the touch operation event. In an example, the first long side has a length of ⅗ of the left long side of the screen 20 and the first long side is located at a lower part on the left long side of the screen 20, that is, the first short side is overlapped with a bottom side of the screen 20. The third long side has a length of ⅗ of the right long side of the screen 20 and the third long side is located at a lower part of the right long side of the screen 20, that is, the third short side is overlapped with the bottom side of the screen 20. Arrangement of the sensing hot region in such a manner can facilitate the user to perform the sliding operation configured to trigger the interface return function. Even if the screen 20 is relatively large and the user operates in a single hand, the sliding operation configured to trigger the interface return function can be carried out easily.

In an optional example, when the first hot region 24 and the second hot region 25 are rectangular regions, lengths of the short sides thereof may be set in consideration with factors such as a screen size, an operation habit and operation convenience, for example, set to be 45 pixels.

In an optional example, the sensing hot region is created when a mobile terminal starts a process configured to manage the UI. For example, in an Android system, the process configured to manage the UI is system ui. In addition, after the mobile terminal is powered on or when a login user account of the mobile terminal is switched, the mobile terminal may start the process for managing the UI and create a relevant UI.

In 102, a touch operation event with a starting touch position in the sensing hot region is received.

When the user performs a touch operation in the screen with a finger or a stylus, the mobile terminal may receive a corresponding touch operation event. For example, the touch operation event may be a clicking operation event, a sliding operation event or a pressing operation event and the like.

The starting touch position of the touch operation event refers to a position in the screen when the finger of the user or the stylus just touches the screen. In the aspect of the present disclosure, the sliding operation event of which the starting touch position is located in the sensing hot region may successfully trigger the interface return function.

In 103, when the touch operation event is a sliding operation event, a lateral displacement of the sliding operation event is acquired.

The lateral displacement refers to a displacement in a width direction of the screen. The unit of the lateral displacement is pixel. It is assumed that a resolution of the screen is 1080*1920 pixels, that is, the screen includes 1920 pixels in its length direction and 1080 pixels in its width direction. Simultaneously assuming that the starting touch position of the sliding operation event is (5, 300), when a present touch position of the sliding operation event is (40, 305), the lateral displacement of the sliding operation event is 35 pixels. Sliding is then continued, and when a current touch position of the sliding operation event is changed into (100, 310), the lateral displacement of the sliding operation event is 95 pixels.

In 104, it is detected whether the lateral displacement is greater than a first threshold.

The first threshold may be a preset empirical value, which may be set in consideration with factors such as the screen size, the operation habit and the operation convenience. For example, the first threshold value is 20 pixels.

It is to be noted that, when the sliding operation event does not disappear, that is, when the sliding operation event is not completed, the mobile terminal may detect whether the lateral displacement is greater than the first threshold successively or at a certain time interval.

In 105, when the lateral displacement is greater than the first threshold, a first UI presently displayed in the screen is switched into a second UI for display when the sliding operation event disappears, or completes.

The second UI is a previous or preceding UI with respect to the first UI and correspondingly, the first UI is a next or following UI with respect to the second UI. Display of the first UI is further triggered on the basis of the second UI. For example, the second UI includes an operation entry configured to trigger the display of the first UI and, in a case that the mobile terminal displays the second UI, the user may trigger the display of the first UI through the operation entry in the second UI. When the user needs to switch back to the second UI from the first UI, the sliding operation introduced above may be implemented to trigger the mobile terminal to perform an interface return operation.

Taking an example of the Android system, when it is determined to perform the interface return operation through the system ui process, an interface return notification is sent to a system server process through an inter-process communication mechanism, the interface return notification being configured to trigger the system server process to perform the interface return operation.

From the above, in the solution provided in the aspect of the present disclosure, a sensing hot region is created on the left side and/or right side of a screen, and a lateral sliding operation event with a starting touch position in the sensing hot region will trigger an interface return function. Compared with triggering of the interface return function by a sliding operation for sliding upwards from the bottom of the screen, the manner provided in the aspect of the present disclosure enables the sliding operation configured to trigger the interface return function to be carried out easily even in a case of a full screen and/or one-hand operation, so that convenience and a success rate for the sliding operation are both improved.

Figure 3:
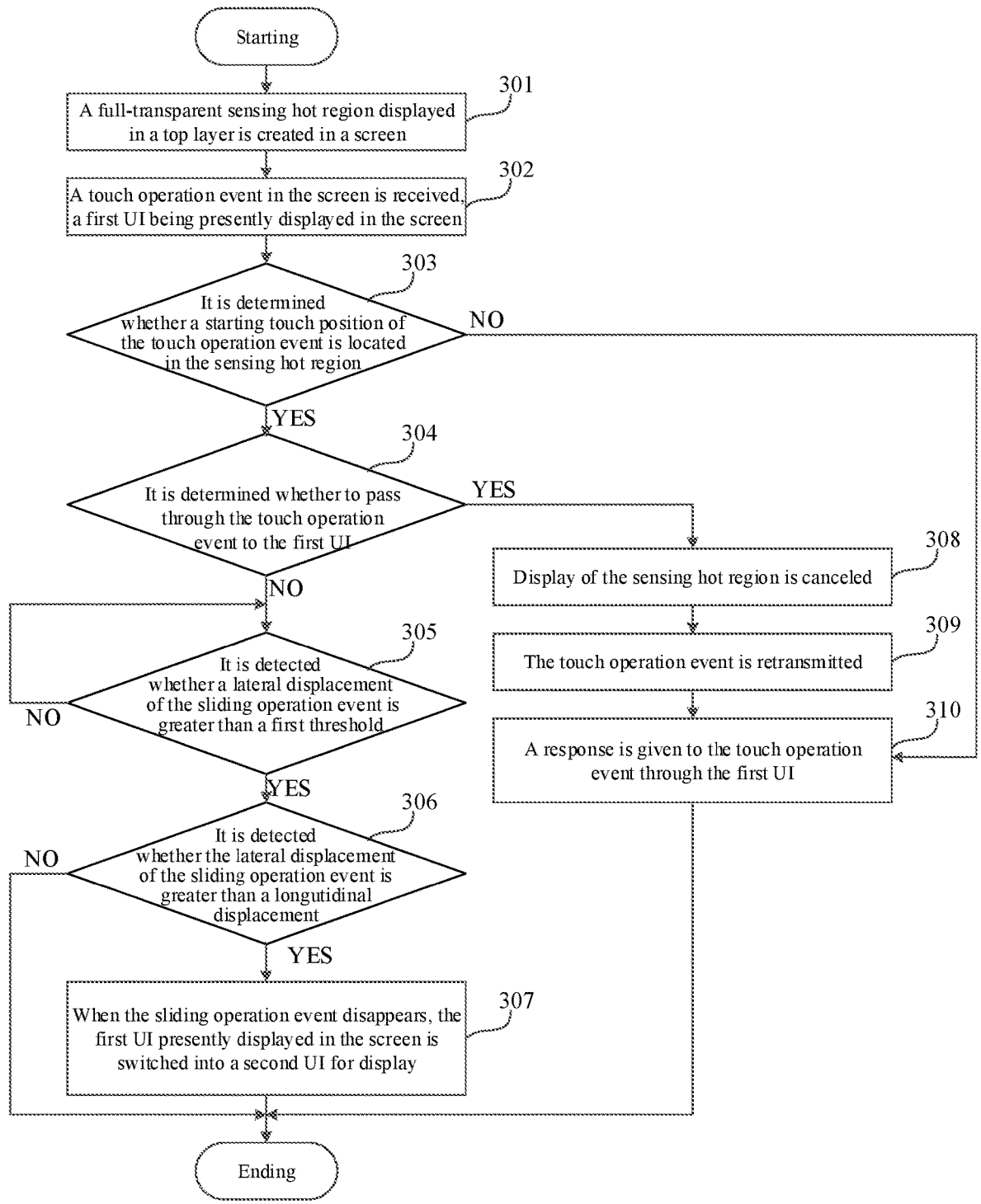
FIG. 3 is a flow chart showing a method for displaying an interface according to another exemplary aspect.

FIG. 3 is a flow chart showing a method for displaying an interface according to another exemplary aspect. The method may include the following operations.

In 301, a fully-transparent sensing hot region displayed in a top layer is created in a screen.

Introductions about the sensing hot region refer to an aspect of FIG. 1 and will not be elaborated thereto in the aspect.

In 302, a touch operation event in the screen is received, a first UI being presently displayed in the screen.

In 303, it is determined whether a starting touch position of the touch operation event is located in the sensing hot region. In response to determining that the starting touch position of the touch operation event is located in the sensing hot region, the operation in 304 is executed. In response to determining that the starting touch position of the touch operation event is not located in the sensing hot region, the operation in 310 is executed.

In 304, it is determined whether to pass the touch operation event to the first UI. In response to determining to pass the touch operation event to the first UI, the operations in 308-309 are executed. In response to determining not to pass the touch operation event to the first UI, the operation in 305 is executed.

In an optional example, when the touch operation event is a sliding operation event and an operable control is displayed, or exists, in a region of the first UI presently displayed in the screen corresponding to the sensing hot region, a mobile terminal determines to pass the touch operation event to the first UI. The operable control may be an application icon such as WeChat, or a button. Or, when the touch operation event is a clicking operation event with a clicking duration longer than a first preset duration, the mobile terminal determines to pass the touch operation event to the first UI. The first preset duration may be a preset empirical value, for example 150 ms. In the aspect of the present disclosure, through such an event pass mechanism influence of the sensing hot region on an original component in the first UI which is required to respond to the touch operation event may be avoided and the response may be normally made to the touch operation event.

When the touch operation event is the sliding operation event and the operable control does not exist in the region of the first UI presently displayed in the screen corresponding to the sensing hot region, the mobile terminal determines not to pass the touch operation event to the first UI.

In 305, it is detected whether a lateral displacement of the sliding operation event is greater than a first threshold. In response to detecting that the lateral displacement of the sliding operation event is greater than the first threshold, the operation in 306 is executed. In response to detecting that the lateral displacement of the sliding operation event is not greater than the first threshold, the procedure ends.

In 306, it is detected whether the lateral displacement of the sliding operation event is greater than a longitudinal displacement. In response to detecting that the lateral displacement of the sliding operation event is greater than the longitudinal displacement, the operation in 307 is executed. In response to detecting that the lateral displacement of the sliding operation event is not greater than the longitudinal displacement, the procedure ends.

The longitudinal displacement refers to a displacement in a length direction of the screen.

It is to be noted that the operation in 306 is optional and, in other possible aspects, the mobile terminal may also directly execute the operation in 307 when detecting that the lateral displacement is greater than the first threshold.

In 307, when the sliding operation event disappears, the first UI presently displayed in the screen is switched into a second UI for display.

The second UI is a previous UI displayed immediately prior to the first UI.

In 308, display of the sensing hot region is canceled or stopped.

In 309, the touch operation event is retransmitted.

When the mobile terminal determines to pass the touch operation event to the first UI, the mobile terminal cancels or stops the display of the sensing hot region and calls an event-simulation interface provided by a system to retransmit the touch operation event to the first UI.

In 310, a response is made to the touch operation event through the first UI.

In an optional example, after canceling or stopping the display of the sensing hot region, the mobile terminal may further execute the following operation that: when the display of the sensing hot region has been cancelled for a duration longer than a second preset duration, the sensing hot region is re-displayed. The second preset duration may be a preset empirical value, for example 500 ms. The sensing hot region is automatically re-displayed to ensure that the touch operation event configured to trigger an interface return function can be normally received.

From the above, in the solution provided in the aspect of the present disclosure, a sensing hot region is created on the left side and/or right side of a screen, a lateral sliding operation event with a starting touch position in the sensing hot region will trigger an interface return function. Compared with triggering of the interface return function by a sliding operation for sliding upwards from the bottom of the screen, the manner provided in the aspect of the present disclosure enables the sliding operation configured to trigger the interface return function to be carried out easily even in a case of a full screen and/or in one-hand operation, so that convenience and a success rate for the operation are both improved.

In addition, through the above event pass mechanism, the influence of the sensing hot region on the original component in the first UI which is required to respond to the touch operation event may be avoided and the response may be normally made to the touch operation event.

Figure 4:
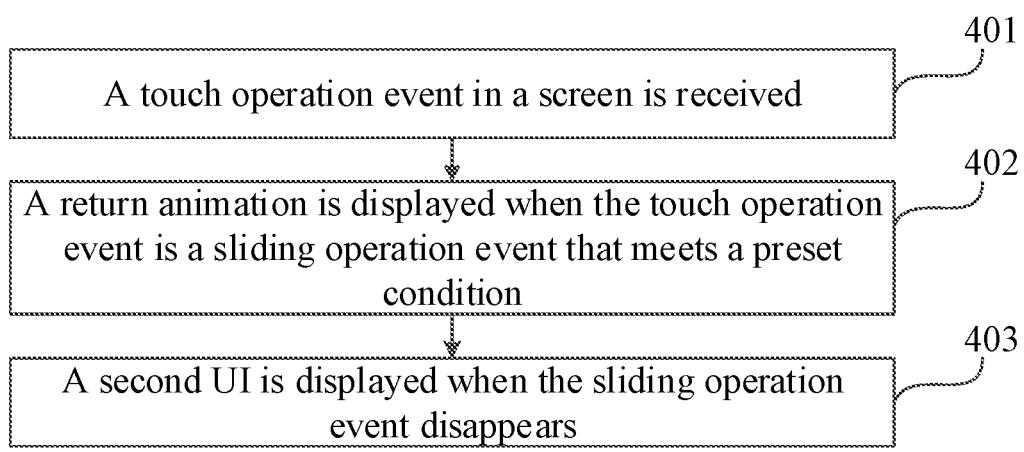
FIG. 4 is a flow chart showing a method for displaying an interface according to another exemplary aspect.

FIG. 4 is a flow chart showing a method for display an interface according to another exemplary aspect. The method may include the following operations.

In 401, a touch operation event in a screen is received.

In 402, a return animation is displayed when the touch operation event is a sliding operation event that meets a preset condition.

In the aspect of the present disclosure, the touch operation event for triggering an interface return function of a mobile terminal is the sliding operation event and the sliding operation event is required to meet the preset condition. In combination with introductions and descriptions in the aspects of FIG. 1 and FIG. 3, the preset condition at least includes that: a starting triggering position of the touch operation event is located in a sensing hot region and a lateral displacement of the touch operation event is greater than a first threshold. In an optional example, the preset condition further includes that the lateral displacement of the touch operation event is greater than a longitudinal displacement.

In the aspect, after receiving the sliding operation event that meets the preset condition, the mobile terminal does not directly execute an interface return operation, but instead, displays the return animation at first. The return animation is configured to indicate that a first UI presently displayed in the screen has been triggered to return to a previous UI so as to prompt a user that the interface return function has been triggered. The return animation may be a transition animation from the first UI to the previous UI with respect to the first UI, which improves interface switching coherence while providing an interface return prompt for the user, so that switching of the interfaces is not too abrupt.

In 403, a second UI is displayed when the sliding operation event disappears or completes.

The second UI is the previous UI with respect to the first UI.

From the above, in the solution provided in the aspect of the present disclosure, a return animation is displayed when a sliding operation event that meets a preset condition is received, and a user is indicated that the first UI presently displayed in the screen has been triggered to return to a previous UI through the return animation. Compared with direct execution of an interface return operation, the solution provided in the aspect of the present disclosure enables the user to perceive that the interface return function has been triggered, thereby improving the interaction performance.

Figure 5A:
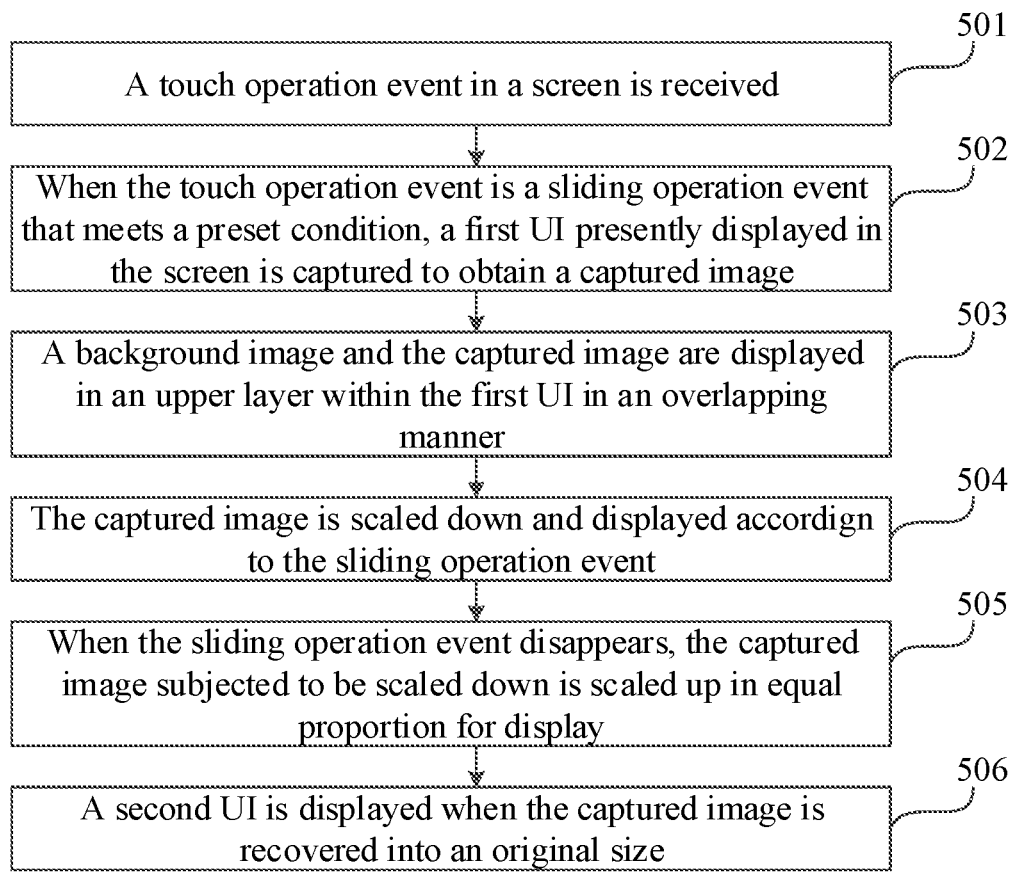
FIG. 5A is a flow chart showing a method for displaying an interface according to another exemplary aspect.

FIG. 5A is a flow chart showing a method for displaying an interface according to another exemplary aspect. A possible implementation for the return animation as mentioned above is introduced and described in the aspect. The method may include the following operations.

In 501, a touch operation event in a screen is received.

In 502, when the touch operation event is a sliding operation event that meets a preset condition, a first UI presently displayed in the screen is captured to obtain a captured image.

When the touch operation event is the sliding operation event that meets the preset condition, an interface return function of a mobile terminal is triggered and, at this time, the mobile terminal starts displaying a return animation. The mobile terminal first calls a screen capturing function and captures the first UI presently displayed in the screen to obtain the captured image. In an optional example, the captured image is stored in a form of a bitmap.

In 503, a background image and the captured image are displayed on an upper layer with respect to the first UI in an overlapping manner.

The background image may be a predefined image and may also be an image generated according to a presently running application program and/or the presently displayed first UI. In an optional example, the background image is a pure-color image, for example, a pure black image, a pure white image or a pure gray image. The display of the background image is located between the first UI and the captured image. That is, the first UI is masked by the background image and the background image is masked by the captured image.

In an optional example, the mobile terminal creates a first drawing window and a second drawing window on the upper layer with respect to the first UI, draws the background image into a first drawing window and draws the captured image into a second drawing window. A display level of the second drawing window is higher than that of the first drawing window. In an optional example, the display level of the second drawing window is lower than that of a sidebar menu. The sidebar menu refers to a UI popped-up and displayed from a side edge of the screen, for example, a notification bar, a status bar, a function menu or the like.

In the aspect of the present disclosure, the captured image may be drawn prior to the background image and may also be drawn together with the background image. In this operation, although the mobile terminal displays in an overlapping manner and in the upper layer with respect to the first UI, the background image and captured image which are used to achieve a return animation effect, no change in the display content of the screen would be perceived by a user from a visual experience of the user.

In 504, the captured image is scaled down and displayed according to the sliding operation event.

With sliding of a finger of the user or a stylus on the screen, the mobile terminal gradually scales down in equal proportion the captured image for display. A size of the captured image has a negative correlation with a sliding distance of the sliding operation event. That is, the size of the captured image is gradually reduced with gradual increasing of the sliding distance.

In an optional example, the size of the captured image has a negative correlation with a lateral displacement of the sliding operation event, and the lateral displacement refers to a displacement in a width direction of the screen. The operation in 504 may include the following sub-operations.

Firstly, a lateral displacement of the sliding operation event is acquired.

The unit of the lateral displacement is pixel. It is assumed that a resolution of the screen are 1080*1920 pixels, that is, the screen includes 1920 pixels in the length direction and 1080 pixels in the width direction. Simultaneously assuming that the starting touch position of the sliding operation event is (5, 300), when a present touch position of the sliding operation event is (40, 305), the lateral displacement of the sliding operation event is 35 pixels. Sliding is then continued, and when a current touch position of the sliding operation event is changed into (100, 310), the lateral displacement of the sliding operation event is 95 pixels.

Secondly, a downscaling coefficient for the captured image is determined according to the lateral displacement.

An original size of the captured image is multiplied by the downscaling coefficient to obtain a size of the captured image subjected to be scaled down. The downscaling coefficient has a value of a positive number which is not greater than 1. The downscaling coefficient has a negative correlation with the lateral displacement. That is, the downscaling coefficient becomes less when the lateral displacement becomes greater.

In an optional example, a minimum threshold is set for the downscaling coefficient. For example, the minimum threshold is 0.9. When the downscaling coefficient reaches the minimum threshold, the downscaling coefficient for the captured image may not be further reduced even though the lateral displacement keeps increasing, that is, the size of the captured image may not be further reduced.

In an optional example, the mobile terminal calculates the downscaling coefficient in the following manner.

In (a), a lateral displacement unit corresponding to the lateral displacement is acquired.

The lateral displacement unit is converted in accordance with the lateral displacement. The lateral displacement unit has a positive correlation with the lateral displacement, and a maximum threshold of the lateral displacement unit is less than a maximum threshold of the lateral displacement. For example, when the maximum threshold of the lateral displacement is 360 pixels, a value range of the lateral displacement is [0, 360]; and when the maximum threshold of the lateral displacement unit is 40, the value range of the lateral displacement is [0, 40]. In the value range [0, 360], the lateral displacement may be mapped to a value in the value range [0, 40]. For example, the lateral displacement unit=the lateral displacement÷9.

In an optional example, the lateral displacement unit $X_2$ is calculated by the mobile terminal in the following formula 1:

$$X_2 = 20 \times (1 - \sin(X_1 + 90)),$$

where $X_1 = \min(X_0, 360) \div 2$, $X_0$ represents the lateral displacement and both of $X_1$ and 90 in the above formula 1 represent an angle. Since $X_0$ has a value greater than or equal to 0, a value range of $X_1$ is [0, 180] and a value range of $X_2$ is [0, 40].

The above formula for calculating the lateral displacement unit $X_2$ is a damping function and is only an example of the damping function. During practical implementation, parameters in the above formula may be properly adjusted to achieve the same calculation effect.

In (b), the downscaling coefficient for the captured image is determined according to the lateral displacement unit.

The downscaling coefficient has a negative correlation with the lateral displacement unit. That is, the downscaling coefficient becomes less when the lateral displacement unit becomes greater.

In an optional example, the downscaling coefficient s is calculated by the mobile terminal in the following formula 2:

$$s=1-X_2\div 1000.$$

With the value range of $X_2$ in the formula 1, a value range of the downscaling coefficient may be determined to be [0.96, 1].

In the solution provided in the aspect of the present disclosure, the lateral displacement is converted into the lateral displacement unit and then the downscaling coefficient is calculated according to the lateral displacement unit, so that change of the captured image in a downscaling procedure is smoother compared with change of the lateral displacement, and thus a slow scaling-down display effect is achieved. Moreover, the maximum threshold is set for the lateral displacement unit, so that the captured image is endowed with a minimum display size and the captured image may not be further scaled down after the minimum display size is reached.

Thirdly, the captured image is scaled down for display according to the downscaling coefficient.

After obtaining the downscaling coefficient by calculation, the mobile terminal multiplies the downscaling coefficient by the original size of the captured image to obtain the size of the captured image after downscaling, and then redraws and displays the captured image according to the calculated size. The original size of the captured image usually corresponds to a size of a display region of the screen.

In addition, the mobile terminal may calculate the downscaling coefficient in real time along with sliding, and synchronously draw and display the corresponding captured image. The mobile terminal may also calculate the downscaling coefficient at a preset time interval and synchronously draw and display the corresponding captured image.

Figure 5B:
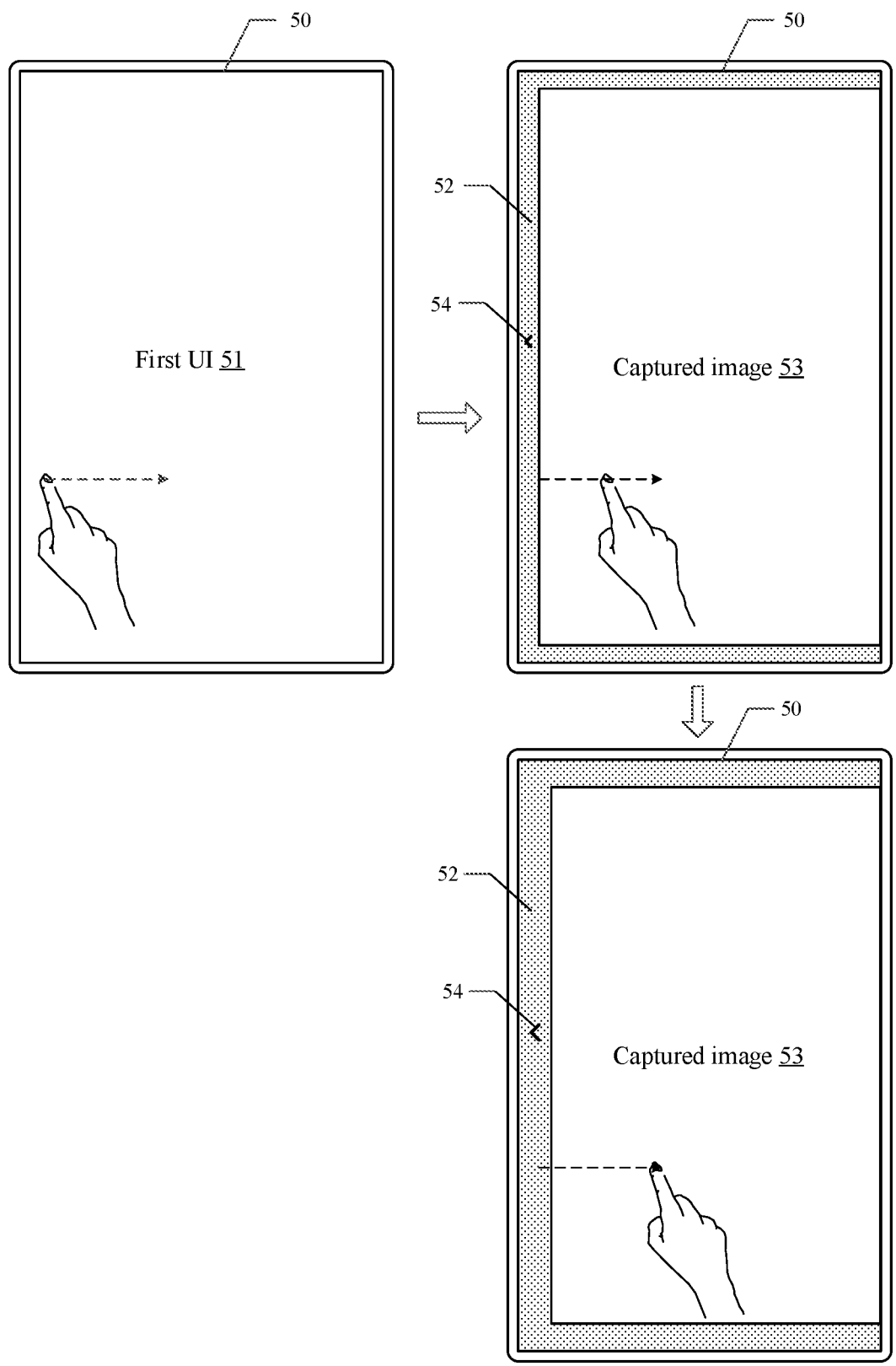
FIGS. 5B and 5C are exemplary schematic diagrams illustrating a return animation.

Referring to FIG. 5B, a first UI 51 is displayed in a screen 50 of a mobile terminal, a user executes a rightward sliding operation in the screen 50 and the mobile terminal displays a background image 52 and a captured image 53 in an overlapping manner in the upper layer with respect to the first UI 51. The captured image 53 is gradually scaled down in a sliding process. In the downscaling procedure, a right side edge of the captured image 53 may be overlapped with a right side edge (i.e., a right side edge of the screen 50) of the first UI 51 and a perpendicular bisector of the captured image 53 in the width direction is overlapped with a perpendicular bisector (i.e., a perpendicular bisector of the screen 50 in the width direction) of the first UI 51 in the width direction.

In addition, since the captured image 53 is gradually scaled down, the background image 52 which is located in a lower layer with respect to the captured image 53 would be gradually emerged. In an optional example, the mobile terminal displays a return identifier 54 in an un-masked region of the background image 52, the un-masked region being a region un-masked by the downscaled captured image 53. The return identifier 54 is an identifier configured to indicate return to the previous UI. In FIG. 5B, the return identifier 53 is only exemplarily illustrated as a leftward indicating arrow. During a practical application, return identifiers 54 in different forms may be set according to requirements.

In 505, when the sliding operation event disappears, the downscaled captured image is scaled up for display.

When the mobile terminal detects that the sliding operation event disappears, that is, the finger of the user or the stylus leaves the screen, the mobile terminal gradually scales up the captured image until recovery to the original size, so as to achieve a rebounding display effect.

In an optional example, the operation in S505 includes the following sub-operations.

Firstly, a downscaling coefficient for each frame of the downscaled captured image in a scaling-up procedure is calculated according to the downscaling coefficient for the captured image and a predefined number of display frame in the scaling-up procedure.

The predefined number of display frame is a predefined empirical value, for example 10 frames. If the downscaling coefficient for the captured image is 0.96 and the predefined number of display frame is 5, the downscaling coefficient for each frame of the downscaled captured image which is displayed in the scaling-up procedure is sequentially 0.968, 0.976, 0.984, 0.992 and 1.

Secondly, the captured image is scaled up frame by frame for display according to the calculated downscaling coefficient.

Of course, the manner for determining the downscaling coefficient for each frame of the captured image displayed in the scaling-up procedure is only exemplary. In other possible implementations, a predefined number may also be added to the downscaling coefficient for the captured image in each frame until the downscaling coefficient is 1. The preset threshold may be a predefined empirical value, for example 0.01.

In 506, a second UI is displayed when the captured image is recovered into an original size.

When the captured image is recovered into the original size, the mobile terminal cancels display of the captured image and the background image, and switches the first UI into the second UI for display.

Figure 5C:
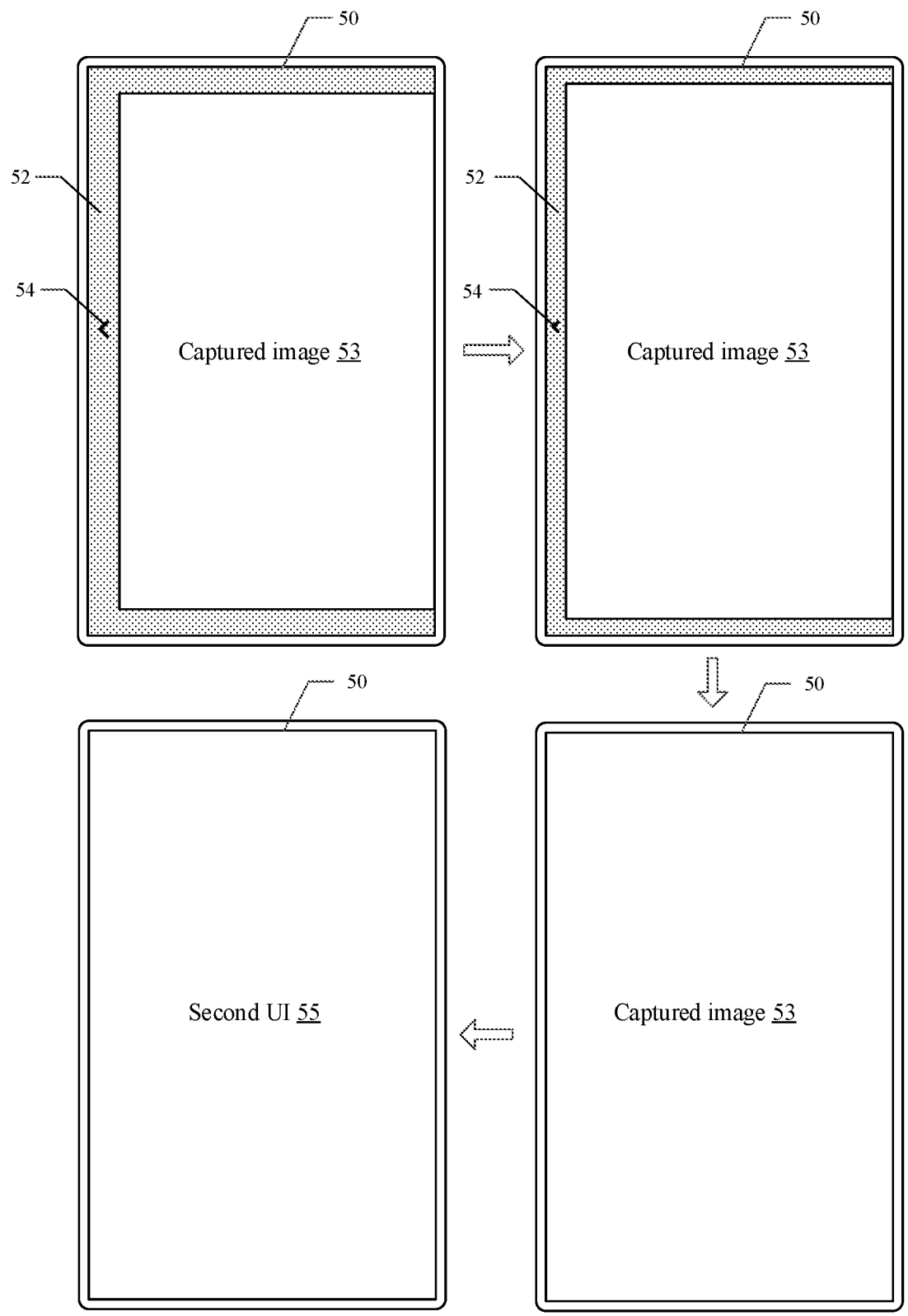

Referring to FIG. 5C, when the finger of the user or the stylus leaves the screen 50, the downscaled captured image 53 is gradually scaled up until the captured image 53 is recovered into the original size, and the mobile terminal cancels the display of the captured image 53 and the background image 52 and switches the first UI 51 into the second UI 55 for display.

It is to be noted that the operation in 505 is optional. That is, when the sliding operation event disappears or completes, the mobile terminal may directly display the second UI. The downscaled captured image is scaled up in equal proportion for display and, when the captured image is recovered into the original size, the second UI is displayed, so that a smoother return animation effect is achieved, switching between the interfaces is more coherent and natural, and thus the display effect is improved.

It is also to be noted that, when the sliding operation event disappears, the mobile terminal may determine whether a lateral displacement unit at a disappearing moment is greater than a preset threshold. In response to determining that the lateral displacement unit at the disappearing moment is greater than the preset threshold, the interface return operation is executed, for example, the mobile terminal scales up the downscaled captured image and, when the captured image is recovered into the original size, the mobile terminal cancels the display of the captured image and the background image and displays the second UI. In response to determining that the lateral displacement unit at the disappearing moment is not greater than the preset threshold, the interface return operation is not executed, for example, the mobile terminal scales up in equal proportion the captured image which is scaled down and, when the captured image is recovered into the original size, the mobile terminal cancels the display of the captured image and the background image and continues displaying the first UI.

It is further to be noted that a setting function of the mobile terminal provides a setting option configured to turn on or turn off the return animation for the user, and the user may select to turn on or turn off the setting option according to a practical requirement. When the setting option is in an on state, the return animation is displayed during return switching of the UIs, and when the setting option is in an off state, the return animation is not displayed but switching is directly performed during return switching between the UIs.

From the above, in the aspect of the present disclosure, the return animation effect is provided, so that switching between the interfaces is coherent and natural and the display effect is good.

The following is a device aspect of the present disclosure, which may be configured to execute the method aspect of the present disclosure. Details undisclosed in the device aspect of the present disclosure refer to the method aspect of the present disclosure.

Figure 6:
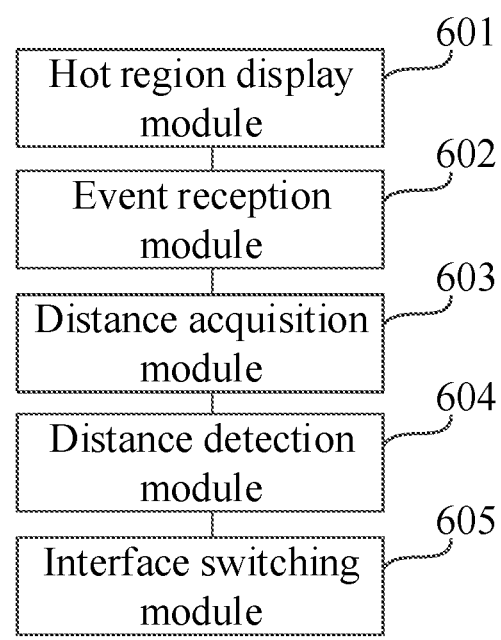
FIG. 6 is a block diagram of a device for displaying an interface according to an exemplary aspect.

FIG. 6 is a block diagram of a device for displaying an interface according to an exemplary aspect. The device has a function of implementing the abovementioned method examples, and the function may be realized by hardware and may also be realized through execution of corresponding software by the hardware. The device may include a hot region display module 601, an event reception module 602, a distance acquisition module 603, a distance detection module 604 and an interface switching module 605.

The hot region display module 601 is configured to create a fully-transparent sensing hot region displayed in a top layer in a screen. The sensing hot region includes a first hot region and/or a second hot region and the screen is divided along a perpendicular bisector in a length direction of the screen into a first screen region and a second screen region. The first hot region is located in the first screen region and an area of the first hot region is less than or equal to an area of the first screen region. The second hot region is located in the second screen region and an area of the second hot region is less than or equal to an area of the second screen region.

The event reception module 602 is configured to receive a touch operation event, a starting touch position of the touch operation event being located in the sensing hot region.

The distance acquisition module 603 is configured to acquire a lateral displacement of a sliding operation event when the touch operation event is the sliding operation event, the lateral displacement being a displacement in a width direction of the screen.

The distance detection module 604 is configured to detect whether the lateral displacement is greater than a first threshold.

The interface switching module 605 is configured to switch a first UI presently displayed in the screen into a second UI for display when the lateral displacement is greater than the first threshold and when the sliding operation event disappears or completes, the second UI being a previous UI with respect to the first UI.

From the above, in the solution provided in the aspect of the present disclosure, a sensing hot region is created on the left side and/or right side of a screen and a lateral sliding operation event with a starting touch position in the sensing hot region will trigger an interface return function. Compared with triggering of the interface return function by a sliding operation of sliding upwards from a bottom of the screen, the manner provided in the aspect of the present disclosure enables the sliding operation configured to trigger the interface return function to be carried out easily even under the conditions of a full screen and a one-hand operation, so that convenience and a success rate for the operation are both improved.

In an optional aspect provided based on the aspect of FIG. 6, the first hot region is a first rectangular region sequentially enclosed by a first long side, a first short side, a second long side and a second short side, the first long side is overlapped with a left long side of the screen and a length of the first long side is less than or equal to a length of the left long side of the screen.

The second hot region is a second rectangular region sequentially enclosed by a third long side, a third short side, a fourth long side and a fourth short side, the third long side is overlapped with a right long side of the screen and a length of the third long side is less than or equal to a length of the right long side of the screen.

In an optional example, the first long side has a length of ⅗ of the left long side of the screen and the first long side is located at a lower part of the left long side of the screen.

The third long side has a length of ⅗ of the right long side of the screen and the third long side is located at a lower part of the right long side of the screen.

Figure 7:
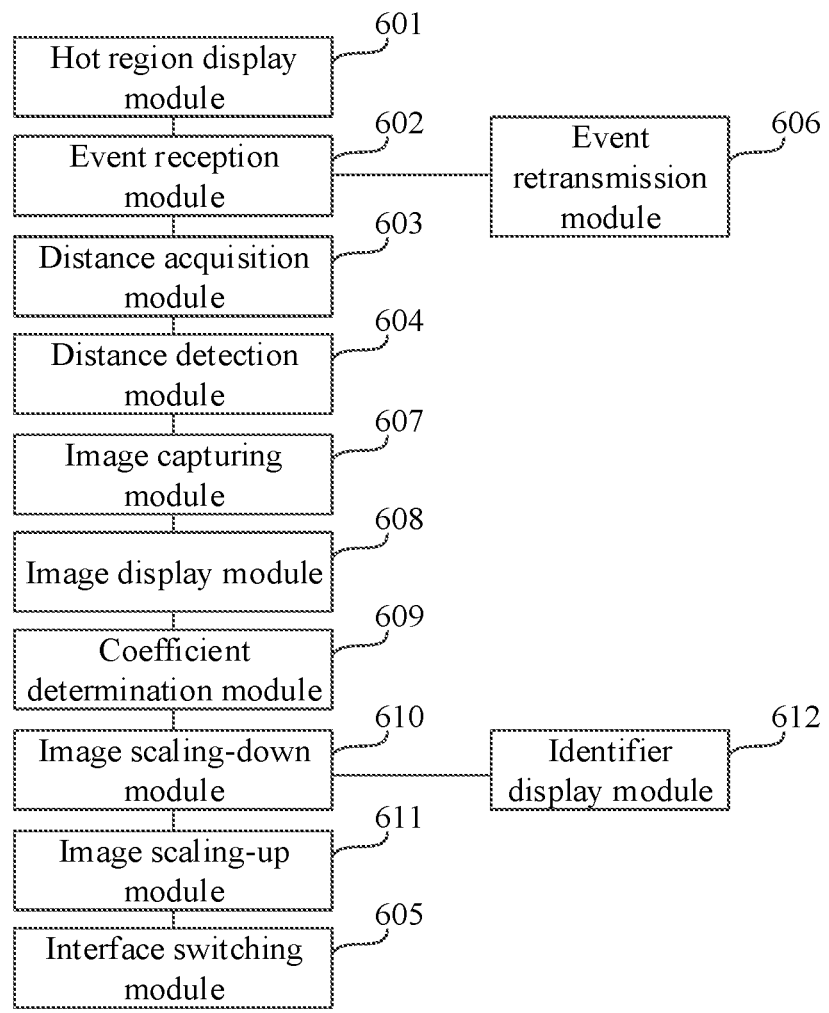
FIG. 7 is a block diagram of a device for displaying an interface according to another exemplary aspect.

In another optional aspect provided based on the aspect of FIG. 6, the device further includes an event retransmission module 606 as shown in FIG. 7.

The hot region display module 601 is further configured to: when the touch operation event is the sliding operation event and an operable control is displayed, or exists, in a region corresponding to the sensing hot region in the first UI presently displayed in the screen, or when the touch operation event is a clicking operation event with a clicking duration longer than a first preset duration, cancel display of the sensing hot region.

The event retransmission module 606 is configured to retransmit the touch operation event to enable the first UI to respond to the touch operation event.

In an optional example, the hot region display module 601 is further configured to re-display the sensing hot region when the display of the sensing hot region has been cancelled for a duration longer than a second preset duration.

In another optional aspect provided based on the aspect of FIG. 6, the device further includes an image capturing module 607, an image display module 608, a coefficient determination module 609 and an image scaling-down module 610 as shown in FIG. 7.

The image capturing module 607 is configured to when the lateral displacement is greater than the first threshold, capture the first UI presently displayed in the screen to obtain a captured image.

The image display module 608 is configured to display a background image and the captured image in an overlapping manner in an upper layer with respect to the first UI, the background image being displayed between the first UI and the captured image and the captured image being displayed below the sensing hot region.

The coefficient determination module 609 is configured to determine a downscaling coefficient for the captured image according to the lateral displacement.

The image scaling-down module 610 is configured to scale down the captured image for display according to the downscaling coefficient.

In an optional example, the coefficient determination module 609 is configured to:

acquire a lateral displacement unit corresponding to the lateral displacement. The lateral displacement unit has a positive correlation with the lateral displacement and a maximum threshold of the lateral displacement unit is less than a maximum threshold of the lateral displacement; and determine the downscaling coefficient for the captured image according to the lateral displacement unit.

In an optional example, the device further includes an image scaling-up module 611.

The image scaling-up module 611 is configured to when the sliding operation event disappears, scale up the downscaled captured image for display until the captured image is recovered into an original size, and perform switching of the first UI presently displayed in the screen into the second UI for display.

In an optional example, the image scaling-up module 611 is configured to:

calculate a downscaling coefficient for each frame of the captured image in a scaling up procedure according to the downscaling coefficient for the captured image which is scale downed and a predefined number of display frame in the scaling up procedure; and scale up the captured image frame by frame for display according to the calculated downscaling coefficient.

In an optional example, the device further includes an identifier display module 612.

The identifier display module 612 is configured to display a return identifier in an un-masked region of the background image, the un-masked region referring to a region unmasked by the downscaled captured image and the return identifier being an identifier configured to indicate return to the previous UI.

It is to be noted that: when its functions are realized, the device provided in the above aspect is only described with division of each abovementioned module as an example. During a practical application, the abovementioned functions may be allocated to different modules for realization according to a practical requirement, that is, a content structure of terminal equipment is divided into different modules to realize all or part of the functions described above.

With respect to the device described in the above aspect, the specific manners for performing operations of individual modules therein have been described in detail in the aspects regarding the method, and will not be elaborated herein.

An exemplary aspect of the present disclosure further provides a device for displaying an interface, which may implement a method for displaying an interface provided in the present disclosure. The device includes a processor; and a memory configured to store an instruction executable for the processor, wherein the processor is configured to:

create a fully-transparent sensing hot region displayed in a top layer in a screen, the sensing hot region including a first hot region and/or a second hot region and the screen being divided along a perpendicular bisector in a length direction of the screen into a first screen region and a second screen region, the first hot region being located in the first screen region and having an area less than or equal to an area of the first screen region, the second hot region being located in the second screen region and having an area less than or equal to an area of the second screen region;

receive a touch operation event, a starting touch position of the touch operation event being located in the sensing hot region;

acquire a lateral displacement of the sliding operation event when the touch operation event is a sliding operation event, the lateral displacement referring to a displacement in a width direction of the screen;

detect whether the lateral displacement is greater than a first threshold; and in response to determining that the lateral displacement is greater than the first threshold, switch from a first UI presently displayed in the screen into a second UI for display when the sliding operation event completes, the second UI being a previous UI displayed immediately prior to the first UI.

In an optional example, the processor is further configured to perform the following operations:

when the touch operation event is the sliding operation event and an operable control exists, or is displayed, in a region of the first UI presently displayed in the screen corresponding to the sensing hot region, or when the touch operation event is a clicking operation event with a clicking duration longer than a first preset duration, cancel display of the sensing hot region; and retransmit the touch operation event to enable the first UI to respond to the touch operation event.

In an optional example, the processor is further configured to:

when the display of the sensing hot region has been cancelled for a duration longer than a second preset duration, re-display the sensing hot region.

In an optional example, the processor is further configured to:

in response to determining that the lateral displacement is greater than the first threshold, capture the first UI presently displayed in the screen to obtain a captured image;

display a background image and the captured image in an overlapping manner in an upper layer with respect to the first UI, the background image being displayed between the first UI and the captured image and the captured image being displayed below the sensing hot region;

determine a downscaling coefficient for the captured image according to the lateral displacement; and scale down the captured image for display according to the downscaling coefficient.

In an optional example, the processor is configured to:

acquire a lateral displacement unit corresponding to the lateral displacement, the lateral displacement unit having a positive correlation with the lateral displacement and a maximum threshold of the lateral displacement unit being less than a maximum threshold of the lateral displacement; and determine the downscaling coefficient for the captured image according to the lateral displacement unit.

In an optional example, the processor is further configured to:

when the sliding operation event completes, scale up the downscaled captured image for display until the captured image is recovered into an original size, and perform switching of the first UI presently displayed in the screen into the second UI for display.

In an optional example, the processor is configured to:

calculate a downscaling coefficient for each frame of the downscaled captured image in a scaling-up procedure according to the downscaling coefficient for the captured image and a predefined number of display frame in the scaling up procedure; and scale up the downscaled captured image frame by frame for display according to the calculated downscaling coefficient.

In an optional example, the processor is further configured to:

display a return identifier in an un-masked region of the background image, the un-masked region referring to a region un-masked by the downscaled captured image and the return identifier being an identifier configured to indicate return to the previous UI.

Figure 8:
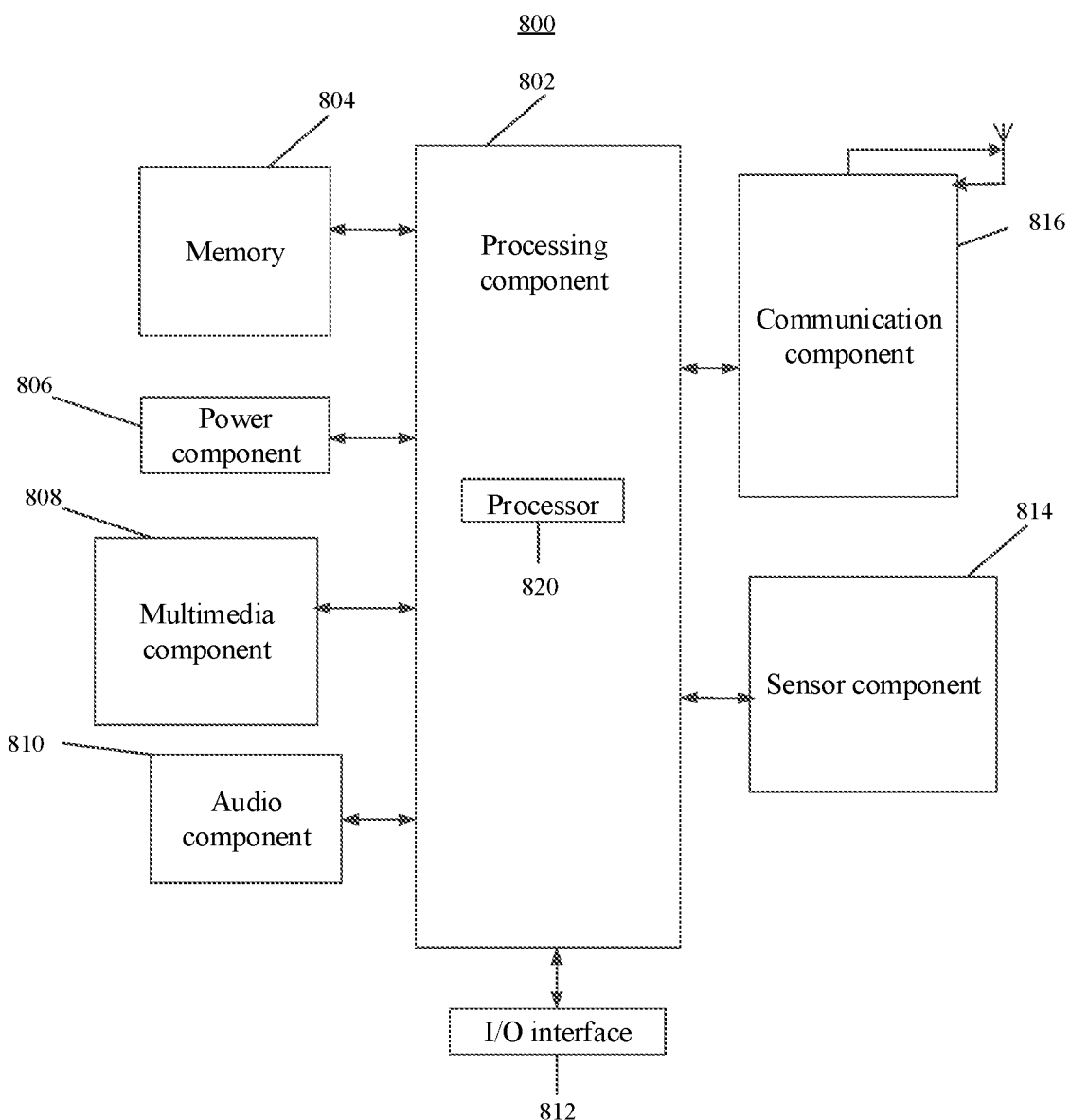
FIG. 8 is a schematic diagram illustrating a device according to an exemplary aspect.

FIG. 8 is a schematic diagram illustrating a device 800 according to an exemplary aspect. For example, the device 800 may be a mobile terminal such as a mobile phone, a tablet computer, a multimedia playing device, an electronic book reader and a personal digital assistant.

Referring to FIG. 8, the device 800 may include at least one of the following components: a processing component 802, a memory 804, a power component 806, a multimedia component 808, an audio component 810, an Input/output (I/O) interface 812, a sensor component 814, and a communication component 816.

The processing component 802 typically controls overall operations of the device 800, such as the operations associated with display, telephone calls, data communications, camera operations and recording operations. The processing component 802 may include one or more processors 820 for executing instructions to perform all or part of the operations in the abovementioned method. Moreover, the processing component 802 may include one or more modules to facilitate interaction between the processing component 802 and the other components. For instance, the processing component 802 may include a multimedia module to facilitate interaction between the multimedia component 808 and the processing component 802.

The memory 804 is configured to store various types of data to support the operations on the device 800. Examples of such data include instructions for any application programs or methods operated on the device 800, contact data, phonebook data, messages, pictures, video and the like. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 806 provides power for various components of the device 800. The power component 806 may include a power management system, one or more power supplies, and other components associated with generation, management and distribution of power for the device 800.

The multimedia component 808 includes a screen for providing an output interface between the device 800 and a user. In some aspects, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect the duration and pressure which are associated with the touch or swipe action. In some aspects, the multimedia component 808 includes a front camera and/or a rear camera. The front camera and/or the rear camera may receive external multimedia data when the device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a Microphone (MIC), and the MIC is configured to receive an external audio signal when the device 800 is in the operation mode, such as a call mode, a recording mode and a voice recognition mode. The received audio signal may further be stored in the memory 804 or sent via the communication component 816. In some aspects, the audio component 810 further includes a speaker configured to output the audio signal.

The I/O interface 812 provides interfaces between the processing component 802 and a peripheral interface module, and the peripheral interface module may be a keyboard, a click wheel, a button and the like. The button may include but not limited to a home button, a volume button, a starting button and a locking button.

The sensor component 814 includes one or more sensors configured to provide state assessment in various aspects for the device 800. For instance, the sensor component 814 may detect an on/off state of the device 800 and relative positioning for components, such as a display and small keyboard of the device 800. The sensor component 814 may further detect a change in a position of the device 800 or a component of the device 800, presence or absence of contact between the user and the device 800, orientation or acceleration/deceleration of the device 800 and a change in temperature of the device 800. The sensor component 814 may include a proximity sensor configured to detect presence of an object nearby without any physical contact. The sensor component 814 may also include a light sensor, such as a Complementary Metal Oxide Semiconductor (CMOS) or Charge Coupled Device (CCD) image sensor, configured for use in an imaging application. In the aspect of the present disclosure, the sensor component 814 at least includes an accelerometer, a gyroscope and a magnetometer.

The communication component 816 is configured to facilitate wired or wireless communication between the device 800 and other equipment. The device 800 may access a communication-standard-based wireless network, such as a Wireless Fidelity (WiFi) network, a 2nd-Generation (2G) or 3rd-Generation (4G) network or a combination thereof. In an exemplary aspect, the communication component 816 receives a broadcast signal or broadcast-related information from an external broadcast management system through a broadcast channel. In an exemplary aspect, the communication component 816 further includes a Near Field Communication (NFC) module to facilitate short-range communication. For example, the NFC module may be implemented based on a Radio Frequency Identification (RFID) technology, an Infrared Data Association (IrDA) technology, an Ultra-Wideband (UWB) technology, a Bluetooth (BT) technology and other technologies.

In an exemplary aspect, the device 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary aspect, there is also provided a non-transitory computer-readable storage medium including an instruction, such as a memory 804 including an instruction, and the instruction may be executed by the processor 820 of the device 800 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

According to a non-transitory computer-readable storage medium, when an instruction (or computer program) in the storage medium is executed by a processor of a device 800, the device 800 may execute the method provided in the aspect shown in FIG. 1.

It is to be understood that "more" mentioned in the present disclosure refers to two or more than two. "And/or" describes an association relationship between associated objects and represent that three relationships may exist. For example, A and/or B may represent the following three conditions: independent existence of A, coexistence of A and B and independent existence of B. The character "/" usually represents that previous and next associated objects form an "or" relationship.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art.

It should be appreciated that the present disclosure is not limited to the exact construction that has been described above and illustrated in the accompanying drawings, and that various modifications and changes may be made without departing from the scope thereof.

What is claimed is:

1. A method for displaying an interface, comprising:
creating a fully-transparent sensing hot region, wherein a display level of the sensing hot region is set to be highest in a screen, and the sensing hot region comprises a first hot region and/or a second hot region, and the screen is divided along a perpendicular bisector in a length direction of the screen into a first screen region and a second screen region, the first hot region being located in the first screen region and having an area less than or equal to an area of the first screen region, the second hot region being located in the second screen region and having an area less than or equal to an area of the second screen region;

receiving a touch operation event, a starting touch position of the touch operation event being located in the sensing hot region;

determining whether to pass the touch operation event to a first User Interface (UI) presently displayed in the screen;

in response to determining that the touch operation event is a sliding operation event and an operable control does not exist in a region of the first UI presently displayed in the screen corresponding to the sensing hot region, acquiring a lateral displacement of the sliding operation event, the lateral displacement being a displacement in a width direction of the screen;

detecting whether the lateral displacement is greater than a first threshold; and in response to determining that the lateral displacement is greater than the first threshold, switching from the first UI presently displayed in the screen into a second UI for display when the sliding operation event completes, wherein the second UI is a previous UI displayed immediately prior to the first UI.

2. The method of claim 1, wherein the first hot region is a first rectangular region enclosed sequentially by a first long side, a first short side, a second long side and a second short side, and the first long side is overlapped with a left long side of the screen and has a length less than or equal to a length of the left long side of the screen; and the second hot region is a second rectangular region sequentially enclosed by a third long side, a third short side, a fourth long side and a fourth short side, and the third long side is overlapped with a right long side of the screen and has a length less than or equal to a length of the right long side of the screen.

3. The method of claim 2, wherein the first long side has a length of three-fifths of the left long side of the screen and the first long side is located at a lower part of the left long side of the screen; and the third long side has a length of three-fifths of the right long side of the screen and the third long side is located at a lower part of the right long side of the screen.

4. The method of claim 1, further comprising:

when the touch operation event is the sliding operation event and the operable control is displayed in the region of the first UI presently displayed in the screen corresponding to the sensing hot region, canceling setting the display level of the sensing hot region to be highest in the screen; and retransmitting the touch operation event to enable the first UI to respond to the touch operation event.

5. The method of claim 4, further comprising:

resetting the display level of the sensing hot region to be highest in the screen when the display of the sensing hot region has been cancelled for a duration longer than a second preset duration.

6. The method of claim 1, further comprising:
in response to determining that the lateral displacement is greater than the first threshold, capturing the first UI presently displayed in the screen to obtain a captured image;
displaying a background image and the captured image in an overlapping manner on an upper layer with respect to the first UI, the background image being displayed between the first UI and the captured image and the captured image being displayed below the sensing hot region;
determining a downscaling coefficient for the captured image according to the lateral displacement; and
scaling down and displaying the captured image according to the downscaling coefficient.

7. The method of claim 6, wherein determining the downscaling coefficient for the captured image according to the lateral displacement comprises:
acquiring a lateral displacement unit corresponding to the lateral displacement, wherein the lateral displacement unit has a positive correlation with the lateral displacement and the lateral displacement unit has a maximum threshold less than a maximum threshold of the lateral displacement; and
determining the downscaling coefficient for the captured image according to the lateral displacement unit.

8. The method of claim 6, further comprising:
when the sliding operation event completes, scaling up the downscaled captured image until the captured image is recovered into an original size, and switching the first UI presently displayed in the screen into the second UI for display.

9. The method of claim 8, wherein scaling up the downscaled captured image comprises:
calculating a downscaling coefficient for each frame of the downscaled captured image in a scaling-up procedure according to the downscaling coefficient for the captured image and a predefined number of displayed frames in the scaling-up procedure; and
scaling up frame by frame the downscaled captured image for display according to the calculated downscaling coefficient.

10. The method of claim 6, further comprising:
displaying a return identifier in an un-masked region of the background image, wherein the un-masked region is a region un-masked by the downscaled captured image, and the return identifier is an identifier configured to indicate return to the previous UI.

11. The method of claim 6, wherein displaying the background image and the captured image in the overlapping manner on the upper layer above the first UI comprises:
creating a first drawing window and a second drawing window on the upper layer with respect to the first UI in the overlapping manner, drawing the background image into the first drawing window and drawing the captured image into the second drawing window, wherein the first drawing window is displayed below the second drawing window.

12. A device for displaying an interface, the device comprising:
a processor; and
a memory configured to store an instruction executable for the processor, wherein the processor is configured to:
create a fully-transparent sensing hot region, wherein the display level of the sensing hot region is set to be highest in a screen, and the sensing hot region comprises of a first hot region and/or a second hot region, and the screen is divided along a perpendicular bisector in a length direction of the screen into a first screen region and a second screen region, the first hot region being located in the first screen region and having an area less than or equal to an area of the first screen region, the second hot region being located in the second screen region and having an area less than or equal to an area of the second screen region;
receive a touch operation event, a starting touch position of the touch operation event being located in the sensing hot region;
determining whether to pass the touch operation event to a first User Interface (UI) presently displayed in the screen;
in response to determining that the touch operation event is a sliding operation event and an operable control does not exist in a region of the first UI presently displayed in the screen corresponding to the sensing hot region, acquire a lateral displacement of the sliding operation event, the lateral displacement being a displacement in a width direction of the screen;
detect whether the lateral displacement is greater than a first threshold; and
in response to determining that the lateral displacement is greater than the first threshold, switch from the first UI presently displayed in the screen into a second UI for display when the sliding operation event completes, wherein the second UI is a previous UI displayed immediately prior to the first UI.

13. The device of claim 12, wherein the processor is further configured to:
when the touch operation event is the sliding operation event and the operable control is displayed in the region of the first UI presently displayed in the screen corresponding to the sensing hot region, cancel setting the display level of the sensing hot region to be highest in the screen; and
retransmit the touch operation event to enable the first UI to respond to the touch operation event.

14. The device of claim 13, wherein the processor is further configured to:
reset the display level of the sensing hot region to be highest in the screen when the display of the sensing hot region has been cancelled for a duration longer than a second preset duration.

15. The device of claim 12, wherein the processor is further configured to:
in response to determining that the lateral displacement is greater than the first threshold, capture the first UI presently displayed in the screen to obtain a captured image;
display a background image and the captured image in an overlapping manner on an upper layer with respect to the first UI, the background image being displayed between the first UI and the captured image and the captured image being displayed below the sensing hot region;
determine a downscaling coefficient for the captured image according to the lateral displacement; and
scale down and display the captured image according to the downscaling coefficient.

16. The device of claim 15, wherein the processor is further configured to:
acquire a lateral displacement unit corresponding to the lateral displacement, wherein the lateral displacement unit has a positive correlation with the lateral displacement and the lateral displacement unit has a maximum threshold less than a maximum threshold of the lateral displacement; and determine the downscaling coefficient for the captured image according to the lateral displacement unit.

17. The device of claim 15, wherein the processor is further configured to:

when the sliding operation event completes, scale up the downscaled captured image until the captured image is recovered into an original size, and switch the first UI presently displayed in the screen into the second UI for display.

18. The device of claim 17, wherein the processor is further configured to:

calculate a downscaling coefficient for each frame of the downscaled captured image in a scaling-up procedure according to the downscaling coefficient for the captured image and a predefined number of displayed frames in the scaling-up procedure; and scale up frame by frame the downscaled captured image for display according to the calculated downscaling coefficient.

19. The device of claim 15, wherein the processor is further configured to:

display a return identifier in an un-masked region of the background image, wherein the un-masked region is a region un-masked by the downscaled captured image, and the return identifier is an identifier configured to indicate return to the previous UI.

20. A non-transitory computer-readable storage medium, having a computer program stored thereon, that when being executed by a processor, performs the operations of:

creating a fully-transparent sensing hot region, wherein the display level of the sensing hot region is set to be highest in a screen, and the sensing hot region comprises of a first hot region and/or a second hot region, and the screen is divided along a perpendicular bisector in a length direction of the screen into a first screen region and a second screen region, the first hot region being located in the first screen region and having an area less than or equal to an area of the first screen region, the second hot region being located in the second screen region and having an area less than or equal to an area of the second screen region;

receiving a touch operation event, a starting touch position of the touch operation event being located in the sensing hot region;

determining whether to pass the touch operation event to a first User Interface (UI) presently displayed in the screen;

in response to determining that the touch operation event is the sliding operation event and an operable control does not exist in a region of the first UI presently displayed in the screen corresponding to the sensing hot region, acquiring the lateral displacement of a sliding operation event, the lateral displacement being a displacement in a width direction of the screen;

detecting whether the lateral displacement is greater than a first threshold; and in response to determining that the lateral displacement is greater than the first threshold, switching from the first UI presently displayed in the screen into a second UI for display when the sliding operation event completes, wherein the second UI is a previous UI displayed immediately prior to the first UI.

* * * * *